Figure 1:
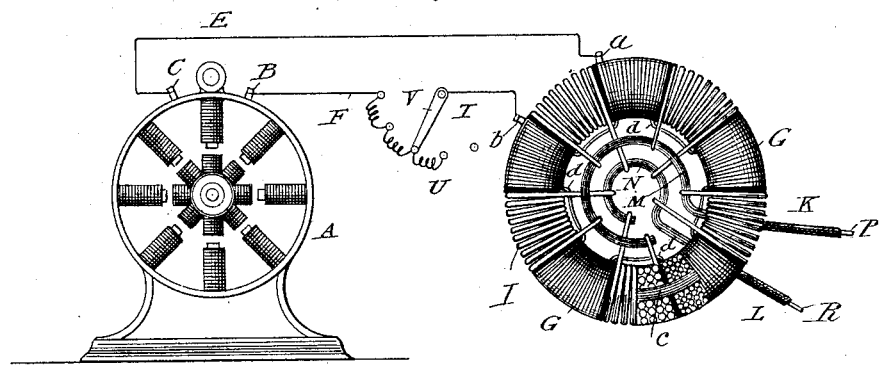

(No Model.) 4 Sheets—Sheet 1.

E. E. RIES.
ELECTRIC WELDING AND TEMPERING METALS.

No. 370,282. Patented Sept. 20, 1887.

Witnesses.

Inventor
Elias E. Ries
per Harding & Tichenor
his Attorneys.

(No Model.) 4 Sheets—Sheet 2.

E. E. RIES.
ELECTRIC WELDING AND TEMPERING METALS.

No. 370,282. Patented Sept. 20, 1887.

Witnesses.

Inventor
Elias E. Ries
per Harding & Tichenor
his Attorneys.

(No Model.) 4 Sheets—Sheet 3.

E. E. RIES.
ELECTRIC WELDING AND TEMPERING METALS.

No. 370,282. Patented Sept. 20, 1887.

Witnesses.
Morris A. Clark,
Charles P. Lincoln.

Inventor
Elias E. Ries
per Harding & Tichenor
his Attorneys (No Model.) 4 Sheets—Sheet 4.

E. E. RIES.
ELECTRIC WELDING AND TEMPERING METALS.

No. 370,282. Patented Sept. 20, 1887.

Witnesses.

Inventor
Elias E. Ries
per Harding & Tichenor
his Attorneys.

UNITED STATES PATENT OFFICE.

ELIAS E. RIES, OF BALTIMORE, MARYLAND, ASSIGNOR OF ONE-HALF TO ALBERT H. HENDERSON, OF SAME PLACE.

ELECTRIC WELDING AND TEMPERING METALS.

SPECIFICATION forming part of Letters Patent No. 370,282, dated September 20, 1887.

Application filed February 26, 1887. Serial No. 228,977. (No model.)

*To all whom it may concern:*

Be it known that I, ELIAS E. RIES, a citizen of the United States, residing at Baltimore, in the State of Maryland, have invented certain new and useful Improvements in Electric Welding and Tempering Metals; and I do hereby declare the following to be a full, clear, and exact description of the invention, such as will enable others skilled in the art to which it appertains to make and use the same.

My invention relates to a new and improved method and apparatus for effecting the welding and tempering of joints between metals by the regulation of the heating effect of an electric current and the immediate application of a tempering bath or compound.

I am aware that a process for utilizing the heating agency of electricity has been heretofore employed in the welding of metal joints, or, in other words, such method has been applied merely to form a joint, without special attention to the restoration of the original temper or hardness of the metal at the point of juncture.

It will be obvious to those skilled in the art to which this invention appertains that the juncture formed between any two like metals of the same cross-section by means of the heat developed in the ratio of the square of the flowing electric current at the point of union or contact will be left in an annealed or softened state. Take, for instance, two sections of steel railroad-rails and effect a fusion between two adjacent extremities thereof by means of an electric current. Manifestly the joint formed will not correspond to the normal hardened condition of the other portions of said sections, and therefore it will be comparatively incapable of strength and durability. Furthermore, in fusing a joint between two steel rails, as before cited, if the current of necessarily low potential and having heavy heating effect should be suddenly applied with its full strength the end of each rail will immediately assume a molten state and a joint will be formed; but such sudden application will destroy the tempering properties of the steel beyond redemption or subsequent restoration by any tempering process. Consequently, although such process may be used to advantage where a mere union is all that is required, it cannot be employed successfully for welding tempered or hardened metals, such as steel, without first gradually regulating the strength of the current permitted to pass through the adjacent ends of the rails, so that the said ends barely attain a melting temperature, and then applying an immediate and effective tempering means. Again, inasmuch as the apparatus necessary for fusing hardened metals by the conversion of electrical energy into heat precludes the employment of ordinary tempering means, and as this difficulty is even more increased in the particular adaptation of this welding and tempering process, my invention has for its object, first, to provide for the regulation of the heating effect of the electric current both before and after the formation of the joint; second, to furnish a suitable tempering compound and improved means for the immediate application of same after fusion; third, to convert a primary current of high potential and small quantity into a current of low potential and heavy heating effect by means of secondary generators or transformers and other apparatus of special construction, and, fourth, to adapt this hereinbefore-mentioned system for advantageous use in laying railway-tracks in continuous sections.

For the attainment of these objects, my invention consists in utilizing a suitable source of electricity, furnishing alternating currents in circuit with an improved inductorium or inductional transformer, and a variable and adjustable current-controlling resistance-switch in the primary circuit, whereby the high-tension currents of small quantity in said primary circuit are converted into low-tension currents of great quantity and heavy heating capacity in the secondary circuit; or, in other words, since it is well known that the combustion of metals is dependent upon the quantity of electricity passing in the heating-circuit, it is the increase by electric conversion in a special form of inductional transformer of the strength of the secondary currents without proportionately increasing the resistance of the welding-circuit.

My invention consists, further, in a chilling or suitable tempering compound, together with appurtenances for facilitating its ready application, and in certain combinations of apparatus having an organization and method of operation particularly applicable for the utilization of the heating capacity of the converted secondary current in continuously and successively welding and tempering metals having a tensive or hardened structure.

Figure 2:
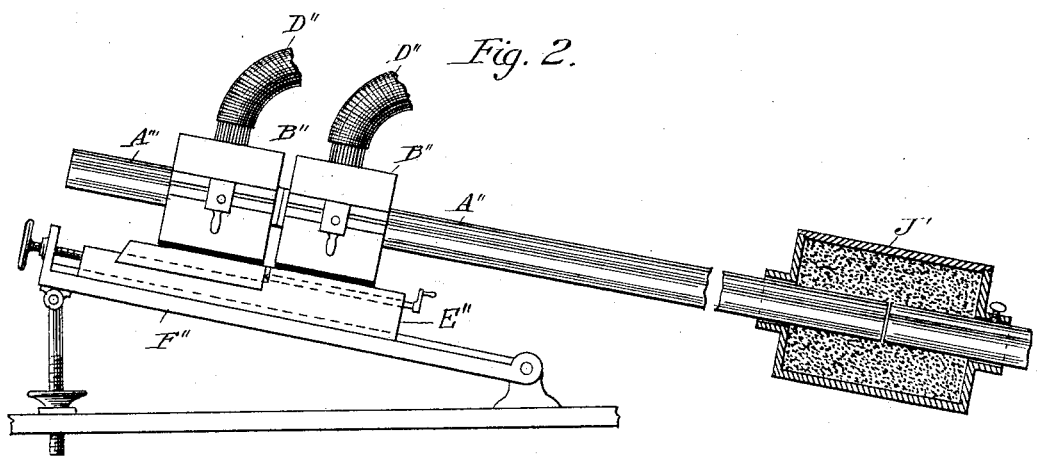
Figure 3:
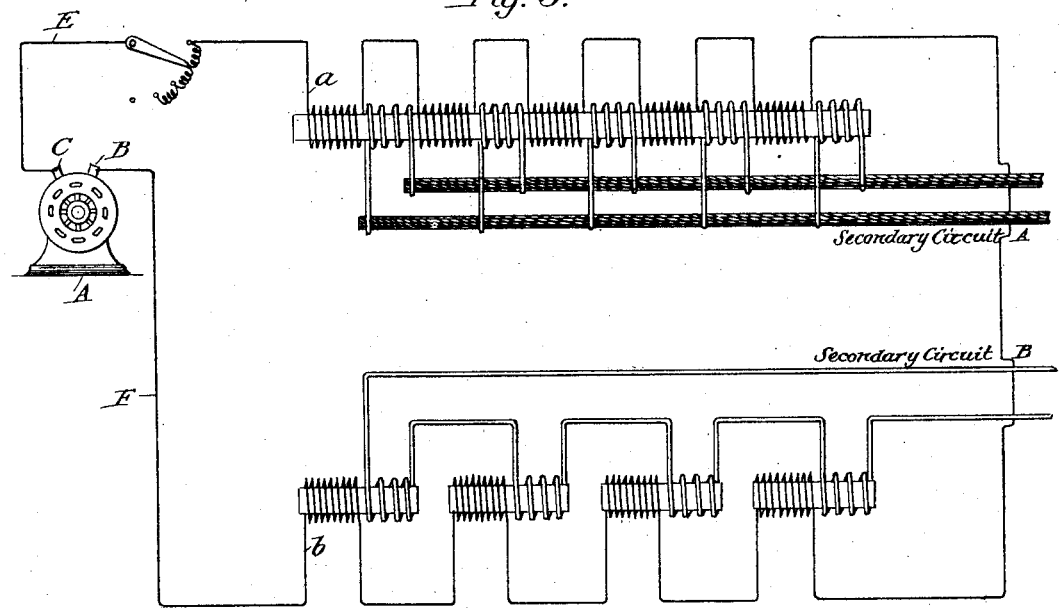
Figure 4:
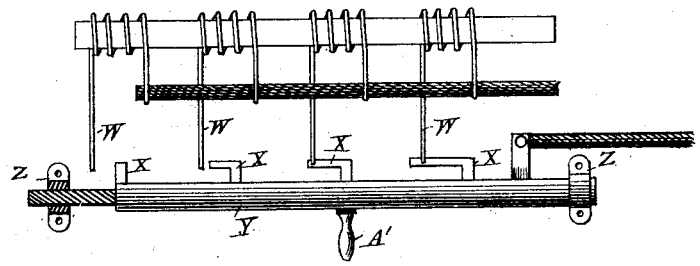
Figure 6:
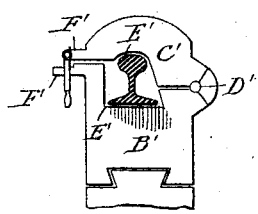
Figure 5:
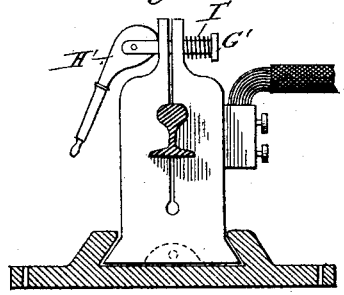
Figure 7:
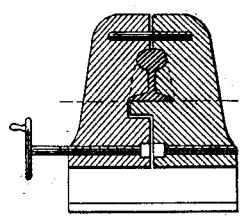
Figure 8:
Figure 11:
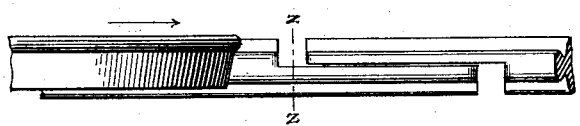
Figures 9, 10:
Figure 12:
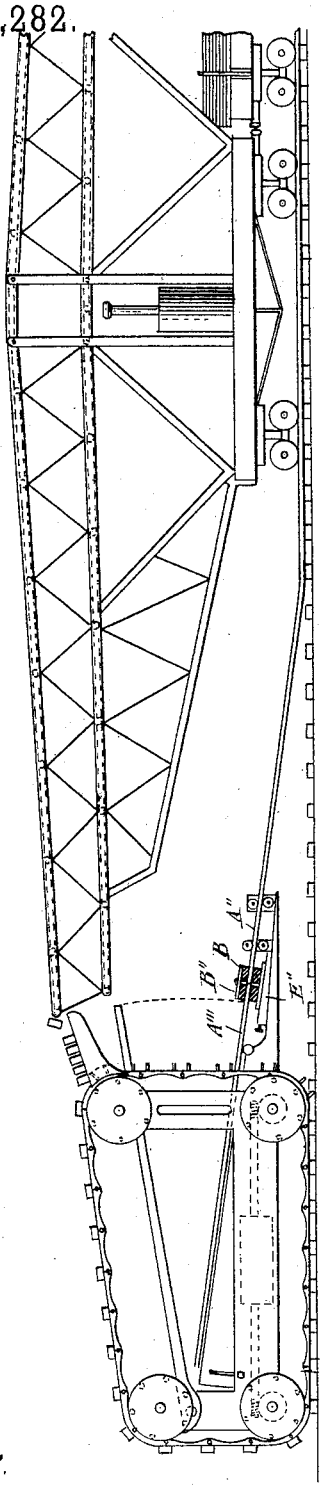
Figure 13:
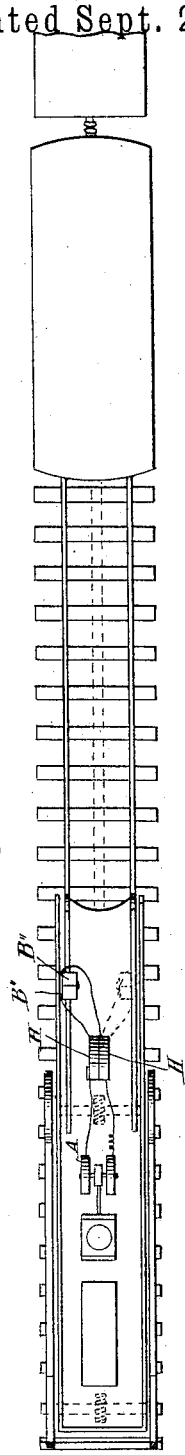

Referring to the accompanying drawings, Figure 1 represents an elevation of an alternating-current dynamo, a secondary generator or converter in circuit with said dynamo, a variable graduated current-controlling resistance-switch and the respective electrical connections. Fig. 2 is a longitudinal side elevation of the tempering-clamps, the auxiliary mechanism for adjusting and sustaining same, and the tempering apparatus arranged upon a joint previously welded. Fig. 3 is a theoretical diagram showing modifications of the inductorium or transformer, the manner of organization, and the electrical connections. Fig. 4 is a view in elevation of the inductorium with its secondary coils arranged in parallel, with adjustable means for successively bringing one or more of said coils into action in the secondary or welding circuit. Fig. 5 is a detail view of one form of welding-clamp for effecting a smooth finished joint, with provisions, as shown, to permit the expansion of the rail while heated. Fig. 6 is a sectional view showing another form of clamp for either smooth or ribbed joint. Fig. 7 is a sectional view showing a modification of the clamp wherein the jaws are independently and simultaneously moved. Fig. 8 is a longitudinal section on line $x\ x$ of Fig. 7. Fig. 9 is a cross-section of an expansion-joint, taken on line $z\ z$ of Fig. 11. Fig. 10 is a cross-section of a ribbed-joint rail, as formed by the jaws of clamp shown in Fig. 7. Fig. 11 is a plan view of the expansion-joint shown in Fig. 9. Fig. 12 is a view, partly in longtitudinal side elevation and partly in section, of an engine and mechanism for laying the ties and track, showing the road-bed and the apparatus for simultaneously and continuously welding and tempering the track-joints. Fig. 13 is a plan view of the track and the tie and track-laying mechanism.

Like letters of reference mark the same parts in all the figures of the drawings.

Referring to the drawings by letters, A represents a dynomo-electric generator, of the ordinary or of any approved construction, for the production of the main line of alternating currents—i. e., successive electric currents of alternating negative and positive polarity.

B and C designate the terminals of dynamo A, and E and F the wires connecting the said terminals respectively with the terminals $a\ b$ of the primary coils of the secondary generator or converter H.

In the form shown in Fig. 1 the converter or inductorium H consists of an annulus or endless ring, $c$, preferably composed of sheets or laminæ of metal insulated from each other and suitably secured together, forming substantially a closed magnetic circuit. The primary and secondary coils G and I are disposed around the whole surface of the iron core in alternate segmental sections, as shown. Primary coils G G are composed of fine wire, and are electrically connected with each other in series by wires $d\ d$, the terminals $a\ b$ being, as before stated, in circuit with terminals B and C of generator by wires E and F. In the spaces between the primary coils are wound the secondary coils I I, which are formed of coarse wire wound in multiple arc, as shown, their electrodes K and L being connected, respectively, with the segmental conducting-wires or connections M and N of the secondary circuit P R leading to the welding mechanism. By this principle of construction the inductive action is increased, the loss of energy in conversion removed, and a greater yield of current attained.

The arrangement of the primary and secondary coils in a homogeneous magnetic field around the core $c$, made up of sections insulated from each other parallel to the lines of magnetic force, will cause the inductive action to be equal upon each particle of wire, the circulation of the Foucault currents, which flow in planes perpendicular to the lines of magnetic force, will be prevented, and the magnetic force in turn can circulate without the production of free magnetic poles, the iron core $c$ being a conductor for the lines of force and not for the electric current. However, a transformer or transformers for the purpose of converting high-tension alternating currents into low-tension currents of increased quantity and heavy heating effect may be constructed in many different ways. The same result may be accomplished by means of the modifications shown in Fig. 3, in which the transformer connecting with secondary circuit A consists of a core having its primary coils wound at intervals thereon and connected with each other in series and with the switch-lever in the primary circuit, and the secondary coils in the spaces or segments between and corresponding in number and relative situation to the primaries, the terminals from said secondary coils being connected in parallel with the secondary circuit A.

The converter connected with secondary circuit B consists of a series of induction-coils having independent cores and primary and secondary coils, the primary coils being connected in series with each other and with the dynamo, and the secondaries also connected in series and having their terminals communicating with the secondary circuit B.

The variable or adjustable resistance-switch is indicated by the letter T, and consists of a series of graduated resistance-coils, U U.

A pivoted contact-arm, V, or other equivalent device, is arranged for varying the amount of resistance in the primary circuit, and for opening and closing the same, as shown.

As illustrated in Fig. 4 of the drawings, the secondary or induction coil has distinct and separate terminals, as indicated by the letter W, which extend downwardly and form contact-bearings for the brackets X X, which are secured to a longitudinally-moving rod or bar, Y, which in turn has its bearings in suitable supports, Z Z, so that it can be reciprocated back and forth to bring one or more of the bearing-brackets into contact with the terminals of the secondary coils and thus increase or diminish the induced current supplied to the welding mechanism at will. The movable rod or bar is provided with an insulated handle, A', by which it may be manipulated, and is electrically connected with the secondary or welding line of the system.

The rails to be welded are laid, as shown in Fig. 2, with their ends adjacent, and the current from the secondary coils is gradually passed through such adjacent ends in any conveninent manner so as to heat them to a welding temperature, it being remembered that, even though the resistance is extremely small at their point of contact, heat will be developed sufficiently to melt the juxtaposed ends. After being thus heated and welded, it is evident that the metal will, as before explained, be annealed or softened at the point of junction, and will not possess the same hardened characteristics as the other portions of the rail, and it is one of the objects of my invention to restore the metal of the rails at the united points to their original condition by tempering the same immediately after welding, thereby enabling railroad-tracks to be continuously laid, welded, and tempered, as will be more fully explained hereinafter.

It will be obvious that in order to prevent the rails from being superheated beyond the spaces occupied by the clamps, which might result from the heat-conductivity of said rails, a suitable cooling or freezing compound may be conveniently applied near the said clamps in any suitable manner. However, this would be a mere expedient, and consequently will not be further dwelt upon.

The process of tempering the rails may be briefly described as follows: The adjacent ends of the metal, after fusion and while still heated, are surrounded with a tempering or chilling material of suitable nature, and subjected to the action thereof for a required period of time. Various substances may be used for this purpose, and hence I do not desire to limit myself to any particular tempering compound; but for general purposes I have found pulverized or powdered carbon of any character to be effective.

It will be obvious that if, after union, the rails should become cool, they could be reheated up to the desired temperature for applying the tempering-bath; or, as preferred, the joint may be first formed, and the tempering process completed after a short interim of time.

In order to hold the ends of the rails to be welded in contact with each other and under slight pressure while the current is being applied, numerous forms of clamping devices may be employed.

Referring to Fig. 6, the letter B' indicates the lower half of a clamp, and C' the upper half of same, the two being pivoted together at D'. The said parts are provided with recesses E' E', in which the end of one of the rails is held during the heating and welding process. The forward edge of the lower part of the clamp is provided with a lug, F', and the corresponding edge of the upper part with a similar lug, having a hand-lever, which engages the lug on the lower part and holds the portions together when required. In this form of clamp the recess is of such size and construction as to permit the clamp to be run along the rails from joint to joint as the sections are successively welded.

In the modification shown in Fig. 5 the clamp is provided with vertically-arranged jaws having mutual recesses to receive the end of the rail. The jaws have lips or lugs at their upper ends, through which passes loosely a headed bolt, G', which is provided with a cam-lever, H', at one end, and a spring, I', at the other, between its bearing against the lip and head, so as to hold the respective parts of the clamp securely against the rails, but at the same time permit them to expand and relieve the said rails while heated.

As shown in Fig. 7 of the drawings, the clamp is composed of two laterally approaching and receding jaws, having also mutual recesses for the rail. The said jaws are operated by a right and left screw to open and close them from and around the adjoining ends of the rails, so as to admit or release the same, as required. In this form of clamp the reciprocating jaws are respectively tongue-and-grooved, so that when separated a support will be provided on either side for the end of a rail, as shown in Fig. 8, one jaw being provided with a screw-headed bolt, which enters a corresponding recess in the opposite jaw when they are closed, and this screw-bolt can be so adjusted as to keep said jaws slightly separated when normally closed. Both recesses of these jaws are so shaped as to form the ribbed joint shown in Fig. 10.

If in practice it should be found necessary to weld two metals of different density—such, for instance, as rolled and cast steel—it will be readily understood that one of said metals will offer a greater resistance to the current than the other, and therefore the clamp adjusted upon the end of the better conductor must be sufficiently removed from its extremity to proportionate the amount of resistance of that particular metal to the resistance of the poorer conductor to which it is to be joined.

It will be apparent that in the adaptation of my system for simultaneously welding, tempering, and laying steel railroad-rails it is essential to provide suitable and convenient apparatus for facilitating the transfer of the welding and tempering mechanism from one jointed section to the next to be jointed, so that this result may be attained economically and expeditiously. With this end in view, Figs. 12 and 13 illustrate a portion of a construction-train for simultaneously effecting the tie-laying and track-supplying, the auxiliary welding and tempering mechanism being more clearly indicated in an enlarged view. (See Fig. 2.) However, the mechanism for laying and spacing the ties, the apparatus for supplying the steel rails at proper intervals to the welding-platform, and such auxiliary and co-operating devices, arrangements, and combinations of parts will not be further described herein, as such is designed to form the subject-matter of another application to be subsequently filed, yet it will be readily understood from the illustrations of these before-mentioned devices that the method of tempering, welding, and laying of the track-rails simultaneouly is both feasible and practicable.

The means for applying and holding the tempering compound or bath consists, preferably, of a suitable inclosing box or casing, J', as shown in Fig. 2, having adjustable means for clamping same upon the rail and over the joint, and provided with an interior receptacle for the chilling material.

It will be understood that any equivalent form of the tempering apparatus to that shown and described may be employed.

By again referring to Fig. 2 it will be seen that the welding-clamps therein represented are mounted upon a movable adjustable base or support, E'', which in turn rests upon the inclined welding-platform. This platform is provided with means, as shown, for varying the inclination of the table F'', so as to increase or decrease the gravity-pressure of the higher clamp, B''.

A'' and A''' represent two rails of similar cross-section, held in contact by the clamps B'' B'' under slight gravity-pressure, owing to the inclined horizontal surface of the table F'' and the weight of the rail A'''.

The operator manipulates the device shown in Fig. 4, thereby gradually passing and applying the induced alternating currents of the secondary circuit through the clamps B'' B'' to the ends of the rail until both extremities are barely fused, the cables D'' D'', consisting of stranded insulated wire, being electrically connected, respectively, with one terminal of the secondary coil and with the rod Y, as shown in Fig. 4, and the bottom of each clamp being insulated from the support E''. After the joint has been thus formed between the rails A'' and A''', the box J', containing the tempering compound, is unfastened from its position and advanced in convenient proximity to this joint, so that it may be applied immediately after the removal of the clamps and the diminution of the heat to the desired degree necessary for the application of the tempering means, at which time the box J' is secured over the joint and allowed to there remain until the next junction is formed. Thus the operation may proceed indefinitely.

In constructing and laying railway-tracks by the use of my improved welding and tempering system, the employment of nut-locks, fish-plates, and such analogous devices is entirely dispensed with, and the surface of the road is rendered even and smooth, thereby saving the wear and tear of the rolling-stock and insuring the comfort of the passengers; but it will be apparent that at certain distances along the track provision must be made for the expansion and contraction of the rails due to the extremes of heat and cold. Such provision is shown, respectively, in Figs. 8 and 11 of the drawings, which illustrate a certain construction of expansion-joint which will amply meet this obvious requirement. However, the same will not be further described or claimed herein, as it will form the subject-matter of another application.

Having thus fully described my invention, what I claim as new, and desire to secure by Letters Patent, is—

1. The method, substantially as described, of effecting a hardened or tempered joint between two metals, which consists, first, in placing the adjacent extremities of the respective metals in contact, passing an electric current of heavy heating effect through such abutting ends, and gradually increasing the current strength until they are fused and united, and, secondly, in tempering the joint thus formed by the application of a suitable chilling or tempering compound, as specified.

2. The herein-described method of welding together two metals of hardened or tempered structure without destroying their respective retempering properties at the point of union, which consists in passing an electric current of heavy heating effect through the ends in contact and gradually increasing the current strength until they reach a fusing temperature, as described.

3. The method of electric welding, which consists in the application of heavy currents to the ends of the metals in contact and under slight pressure and gradually increasing the current strength until the same are united, whereby the retempering properties of said metals are not destroyed beyond restoration.

4. The herein-described method of effecting a hardened or tempered juncture between two metals of similar density and like cross-section, which consists, first, in welding the ends in contact by the passage of an electric current or currents therethrough, and, secondly, in reheating the said joint and applying a suitable tempering compound when the joint has reached the desired degree of heat for tempering.

5. In an apparatus for electric welding and tempering, the adjustable receptacle or box holding the tempering compound, having means for securing it over the joint, and a longitudinal opening of the desired size to allow the entrance of the metals welded, as set forth.

6. In an apparatus for electric welding and tempering steel railroad-rails, a clamp having jaws provided with corresponding recesses conforming to the shape of the rail, and further provided with means for locking and unlocking said jaws, in combination with an inclined adjustable table having a supplemental movable top insulated from the clamp, as shown and described.

7. The combination of a suitable source of electricity furnishing alternating currents of heavy heating effect, the adjustable movable clamps respectively in circuit with said source of electricity, the adjustable tempering-box containing a suitable tempering compound, and the rails held by the said clamps, as specified.

8. In combination, a suitable source of electricity furnishing alternating currents of heavy heating effect, the means, such as described, for regulating and controlling the strength of the current, the adjustable movable rail-clamps, the adjustable supporting-table, the rails held by the clamps, and the electrical connections, as shown.

9. In combination, a suitable source of electricity furnishing alternating currents of heavy heating effect, the means, such as described, for controlling the flow of the electric currents, the adjustable movable rail-clamp, the tempering-box provided with means for securing the same over a welded joint, the rails held by said clamp, and the electrical connections, as set forth.

10. The herein-described method of forming a line of railway-track, which consists, first, in placing the adjacent extremities of the rail-sections in contact, passing an electric current of heavy heating effect through such abutting ends, and gradually increasing the current strength until they are fused and united; secondly, in tempering the joint thus formed by the application of a suitable chilling or tempering compound, and, thirdly, in laying the rails thus jointed along the line of way immediately upon the completion of each joint between the successive sections, substantially as specified.

In testimony whereof I affix my signature in presence of two witnesses.

ELIAS E. RIES.

Witnesses:
A. H. HENDERSON,
M. P. CALLAN.